(12) United States Patent
Micciche et al.

(10) Patent No.: US 6,510,940 B1
(45) Date of Patent: Jan. 28, 2003

(54) VACUUM ASSISTED WALKING BEAM APPARATUS

(75) Inventors: Brian S. Micciche, Wrightsville, PA (US); Brad M. Dingle, Red Lion, PA (US)

(73) Assignee: Ascor, Inc., York, PA (US)

( * ) Notice: Subject to any disclaimer, the term of this patent is extended or adjusted under 35 U.S.C. 154(b) by 0 days.

(21) Appl. No.: 09/890,040

(22) PCT Filed: Mar. 22, 1999

(86) PCT No.: PCT/US99/06179

§ 371 (c)(1),
(2), (4) Date: Jul. 25, 2001

(87) PCT Pub. No.: WO00/56642

PCT Pub. Date: Sep. 28, 2000

(51) Int. Cl.⁷ .............................................. B65G 15/42
(52) U.S. Cl. .................................. 198/689.1; 198/774.1
(58) Field of Search ............................ 198/689.1, 774.1

(56) References Cited

U.S. PATENT DOCUMENTS

| | | | | |
|---|---|---|---|---|
| 3,701,412 A | * | 10/1972 | Wriedt | 198/127 R |
| 3,708,058 A | * | 1/1973 | Kalven | 198/184 |
| 3,722,665 A | * | 3/1973 | Probasco | 198/184 |
| 4,096,941 A | * | 6/1978 | Tokuno | 198/689 |
| 4,323,149 A | * | 4/1982 | Pavone | 198/471 |
| 4,555,013 A | * | 11/1985 | Franklin | 198/689.1 |
| 4,672,792 A | * | 6/1987 | Wallin | 53/374 |
| 4,890,725 A | * | 1/1990 | Fierkens et al. | 198/774 |
| 4,993,937 A | * | 2/1991 | Ginnasi | 425/444 |
| 5,127,511 A | * | 7/1992 | Keen, Jr. et al. | 198/461 |
| 5,695,043 A | * | 12/1997 | Maezuru et al. | 198/689.1 |
| 6,008,476 A | * | 12/1999 | Neiconi et al. | 219/388 |
| 6,102,191 A | * | 8/2000 | Janzen et al. | 198/689.1 |
| 6,158,573 A | * | 12/2000 | Janzen | 198/689.1 |
| 6,216,848 B1 | * | 4/2001 | Zens | 198/689.1 |
| 6,227,541 B1 | * | 5/2001 | Couillard et al. | 271/307 |
| 6,230,876 B1 | * | 5/2001 | Gilberti et al. | 198/803.5 |
| 6,422,377 B1 | * | 7/2002 | Ulrich | 198/689.1 |

\* cited by examiner

Primary Examiner—Christopher P. Ellis
Assistant Examiner—Rashmi Sharma
(74) Attorney, Agent, or Firm—Zachary T. Wobensmith, III

(57) ABSTRACT

A vacuum assisted multiple position walking beam apparatus (10), which has products (20) placed thereon.

7 Claims, 2 Drawing Sheets

VACUUM ASSISTED WALKING BEAM APPARATUS

BACKGROUND OF THE INVENTION

1. Field of the Invention

This invention relates to a vacuum assisted multiple position walking beam apparatus, which precisely advances and locates products, which are placed and advanced thereon in a row for straight line production operations.

2. Description of the Prior Art

In the Photovoltaic industry silicone wafers or cells are assembled into panels by arranging them in an x-y matrix. This process has been accomplished manually and through the use of automation. The automation concepts can be summarized into two basic methods. The first method is commonly referred to as matrixing, and involves placing each cell into a grid fixture one at a time, and then moving the grid around to solder each cell together. The second approach is commonly referred to as stringing, and involves placing and soldering each cell into a row of the matrix individually, thereby forming "strings" of cells. These strings can then be placed into storage buffers or placed directly onto a glass to form the panel. The stringing method represents a more compact solution which ultimately requires less floor space, and is gaining popularity in the industry. The automation that is currently available for stringing solar cells utilizes a metal belt to transport the string as it is being constructed. Many problems exist with the metal belt apparatus, which include belt tracking, belt warpage, belt life, difficulty in precisely holding and supporting the wafers as they are transported and soldered, and the expense involved in maintaining and operating the equipment.

The multiple position vacuum assisted walking beam apparatus of the invention is useful in the photovoltaic industry and any industry in which wafer like products must be precisely located and advanced in a straight line for processing, which apparatus provides precision location, advancement and holding of the products for processing without the problems of previously available equipment.

SUMMARY OF THE INVENTION

In developing apparatus for assembling strings of photovoltaic cells several criteria were involved. The apparatus must maintain the alignment of the cells as they are placed next to each other, must not touch or damage the cell edges, and must be easily configured for different cell sizes and string lengths. Because the cell edges are fragile, a concept was required that would not involve touching the cell edges to move the cell or string. Vacuum was selected as the best method to grip or hold the cell after it was placed into the string. The walking beam concept was selected for transporting and processing the strings, which included a movable center beam, and two stationary side beams. With a conventional walking beam mechanism, two separate beams are utilized. One beam remains stationary while the other beam moves up and down in the vertical axis and back and forth in the horizontal axis. The moving beam will lift the string from the stationary beam, carry the string forward, lower the string onto the stationary beam, move below the level of the string, and retract to the home position. In order to hold the cells, vacuum was added to both the moving beam, and the stationary beams. Vacuum switching was provided to operate when the moving beam was exactly coplanar with the stationary beams, so the cell was not pulled by the vacuum and broken. To solve this problem, a third position was introduced to the center beam. The moving center beam therefor has three vertical positions described as; above the stationary beams, coplanar with the stationary beams, and below the stationary beams. Vacuum is directed into the moving beam when the string is being lifted, carried forward, and lowered to the coplanar position. When the moving center beam is coplanar with the stationary beams vacuum is switched from the moving beam to the stationary beams and the string/cells is/are then anchored to the stationary beams. The moving beam, now without vacuum, is free to drop below the string and retract in preparation for the next move. At this time, the next cell is placed on the stationary beams and soldered to the adjacent cell. The string is always held by vacuum whether it is held to the stationary beams or held to the moving beam. At no time is the string without vacuum. This is important as the aesthetics and performance of the solar module are due in part to the alignment and positioning of the cells within the module.

It has now been found that a multiple position vacuum assisted walking beam apparatus can be constructed, which has wafer like products placed thereon, which apparatus includes a movable center beam and fixed side beams, one on each side of the center, with vacuum selectively applied to the center beam and the side beams to support the products as they are transported and processed.

The principal object of the invention is to provide a vacuum assisted multiple position walking beam apparatus for support, attachment, and transport of products in a string configuration.

A further object of the invention is to provide apparatus of the character aforesaid which is precise and positive in operation.

A further object of the invention is to provide apparatus of the character aforesaid which is of rigid construction.

A further object of the invention is to provide apparatus of the character aforesaid which is resistant to wear and fatigue.

A further object of the invention is to provide apparatus of the character aforesaid, which is useful with a wide variety of products and manufacturing operations.

A further object of the invention is to provide apparatus of the character aforesaid, which is simple to construct but rugged and long lasting in service.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
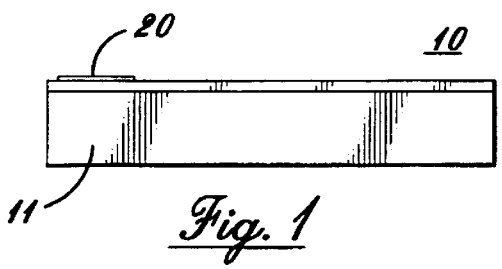
FIG. 1 is a side elevational view of a multiple position vacuum assisted walking beam apparatus, in initial position with a single wafer thereon.

It should, of course, be understood that the description and drawings herein are merely illustrative and that various modifications and changes can be made in the structures disclosed without departing from the spirit of the invention.

Like numbers refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to FIGS. 1–14 inclusive, the walking beam apparatus 10 of the invention is therein illustrated. The apparatus 10 includes a pair of elongated side beams 11 and 12, which are stationary and fixed to a frame (not shown) of a machine (not shown) with which they are used. The beams 11 and 12 are spaced apart and a center beam 14 is provided between the stationary beams 11 and 12.

The center beam 14 is movable between the stationary beams, vertically, and horizontally to be described.

The center beam 14 is mounted to well known mechanism (not shown) which provides its movement. The stationary beams 11 and 12, and the center beam 14 are preferably of metal with a plurality of spaced vacuum holes 15 therein, which are connected to a selectively controlled vacuum source (not shown) of well known type.

Products to be transported by apparatus 10 are shown in the Figs. and as illustrated are photovoltaic cells 20, which are to be joined together to form a string 21 which are then placed to form solar panels (not shown).

Figure 2:
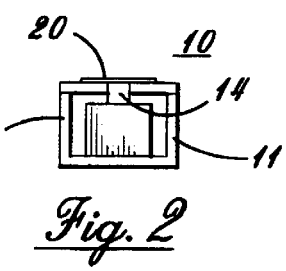
FIG. 2 is an end view of the apparatus of FIG. 1.

In operation photovoltaic cells 20 are placed on the beams 11, 12, and 14 as shown in FIGS. 1 and 2.

Figure 3:
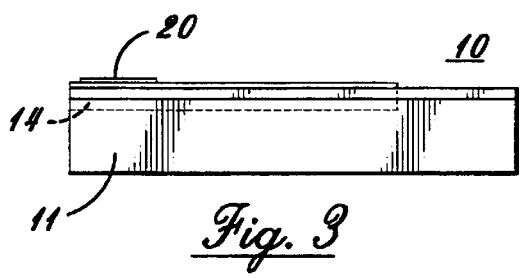
FIG. 3 is a view similar to FIG. 1 with the center beam of the apparatus in raised position.
Figure 4:
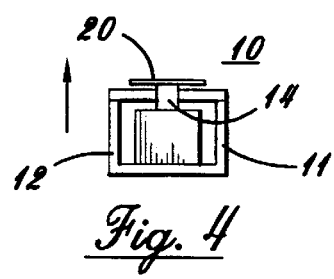
FIG. 4 is an end view of the apparatus of FIG. 3.
Figure 5:
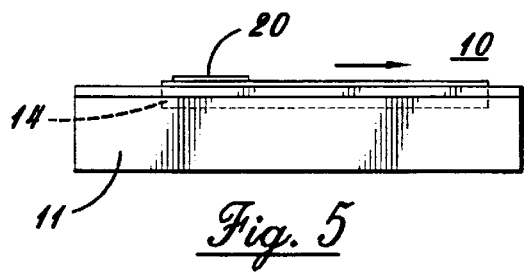
FIG. 5 is a view similar to FIG. 3, illustrating the center beam in the forward or advanced position.
Figure 6:
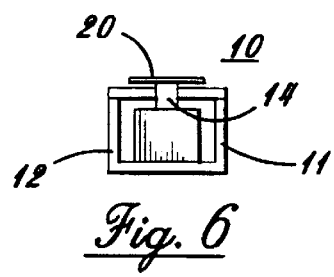
FIG. 6 is an end view of the apparatus of FIG. 5.
Figure 7:
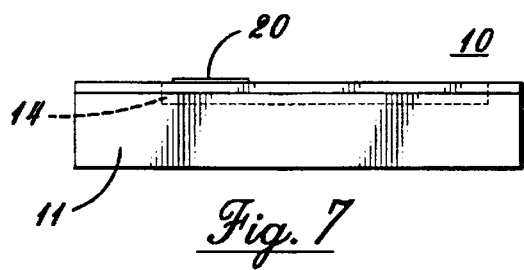
FIG. 7 is a view similar to FIG. 1, with the center beam in neutral position, at the same level as the side beams.
Figure 8:
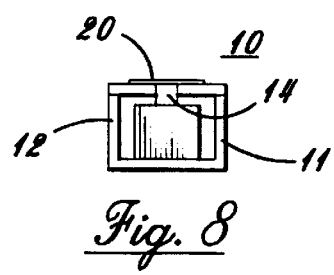
FIG. 8 is an end view of the apparatus of FIG. 7.
Figure 9:
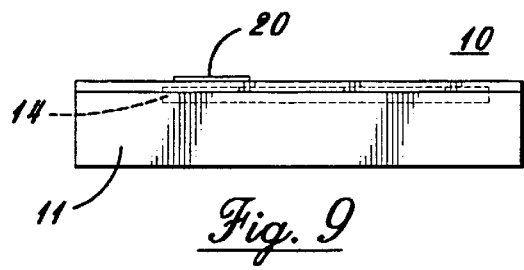
FIG. 9 is a view similar to FIG. 7, with the center beam lowered below the side beams.
Figure 10:
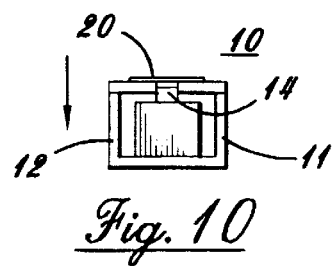
FIG. 10 is an end view of the apparatus of FIG. 9.
Figure 11:
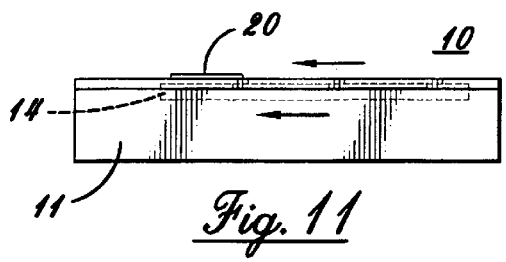
FIG. 11 is a view similar to FIG. 9, with the center beam in retracting condition.
Figure 12:
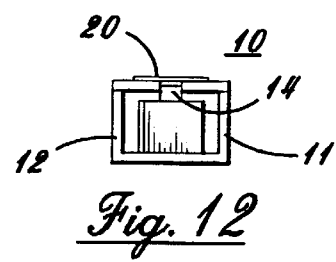
FIG. 12 is an end view of the apparatus of FIG. 11.
Figure 13:
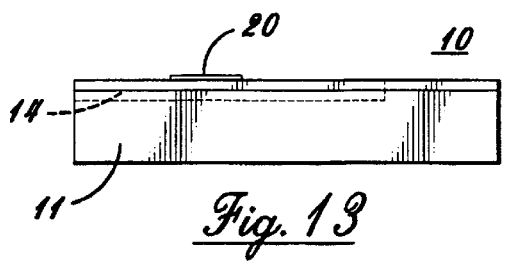
FIG. 13 is a view similar to FIG. 1, with the center beam in initial position.
Figure 14:
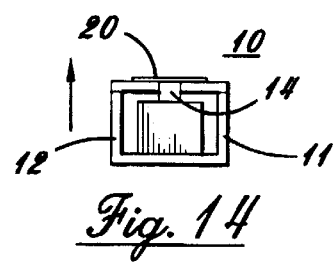
FIG. 14 is an end view of the apparatus of FIG. 13.
Figure 16:
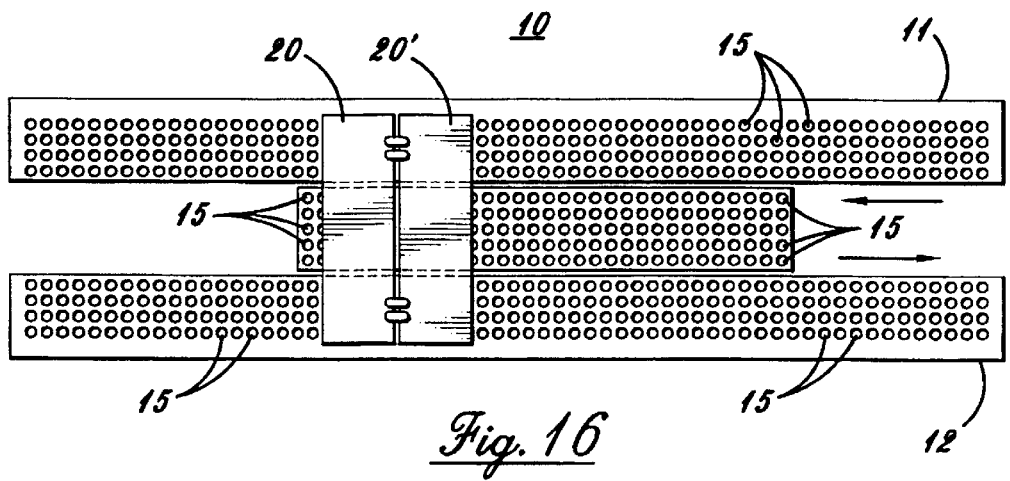
FIG. 16 is a top plan view, enlarged, of the apparatus of the invention.

Vacuum is applied to the center or movable beam 14, with vacuum off at beams 11 and 12. The center beam 14 is raised as shown in FIGS. 3 and 4 and then moved forwardly as shown in FIGS. 5 and 6, with vacuum maintained on center beam 14. The beam 14 is moved downwardly to the neutral position as shown in FIGS. 7 and 8, with vacuum turned off to center beam 14, and vacuum applied to the stationary beams 11 and 12, which is controlled by a sensor (not shown) of well known type. The center beam 14 is dropped downwardly as shown in FIGS. 9 and 10, and retracted to the left as shown in FIGS. 11 and 12, until it reaches the position shown in FIGS. 13 and 14, when it is raised into contact with the cell 20, with vacuum applied to beams 11, 12, and 14. As shown in FIG. 16, an additional cell 20' is placed next to the cell 20 as shown, vacuum is applied to the stationary beams and turned off to the center beam 14 when it is coplanar with side beams 11 and 12, with cell 20' soldered to the cell 20 over the stationary beams 11 and 12 in well known manner, while the center beam 14 is retracting.

Figure 15:
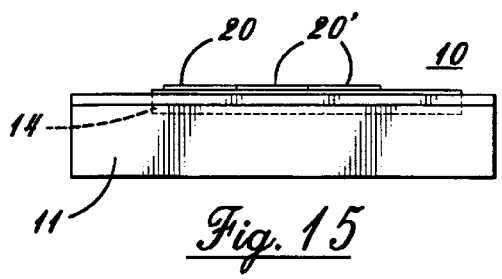
FIG. 15 is a view similar to FIG. 1 with a string of wafers thereon, with the center beam in the forward position.

The operation continues as described with additional cells 20', etc. placed on beams 11, 12, and 14 and soldered together to form the string 21 as shown in FIG. 15.

It should be noted that as the length of the beams 11, 12 and 14 increase the number of vacuum holes 15 in the beams 11, 12 and 14 also increase. As the number of holes 15 increase the effective vacuum leakage area also increases. By measuring the vacuum pressure across the length of the beams 11, 12 and 14 with no cells 20 in place, it was observed that the effective vacuum decreases as you move down the beams to the point where the cells would not be adequately clamped at the far end of the beams. If you block the holes 15, the vacuum pressure increases. Because the cells are added to the string 21 as the string 21 is "walked" down the beams, the cells act like plugs and allow the vacuum pressure to remain at acceptable levels, regardless of the beam length. By introducing the cells 20 to the beams 11, 12 and 14 at the same end as the vacuum source, the vacuum pressure loss is offset by progressively blocking the holes 15 with the cells 20 and 20'. This allows the vacuum generator to be smaller and more energy efficient than would otherwise be required and also eliminates the need to create vacuum zones in the beam. While photovoltaic cells are illustrated, any wafer like product can be similarly processed.

It will thus be seen that a vacuum assisted walking beam apparatus has been provided with which the objects of the invention are achieved.

We claim:

1. A vacuum assisted walking beam apparatus for transporting and processing products placed thereon, which comprises
    a pair of elongated spaced stationary side beams,
    a movable center beam between said side beams,
    means for moving said center beam with respect to said side beams in horizontal and vertical directions to transport said products,
    said beams have a plurality of openings therein,
    vacuum means in communication with said openings to selectively apply vacuum to said openings in said beams to hold said products during transport and while stationary.

2. A walking beam apparatus as defined in claim 1, in which
    said beams are formed of metal.

3. A walking beam apparatus as defined in claim 1, in which said products are photovoltaic cells.

4. A walking beam apparatus as defined in claim 3, in which
    said photovoltaic cells are placed adjacent to each other on said beams and soldered together to form strings.

5. A walking beam apparatus as defined in claim 1, in which
    said vacuum means is selectively applied to retain said products on said center beam for transporting and said side beams for stationary holding.

6. A walking beam apparatus as defined in claim 1 in which
    said center beam means for moving has three vertical positions,
    said three vertical positions are above the stationary beams, coplanar with the stationary beams, and below the stationary beams.

7. A walking beam apparatus as defined in claim 5 in which
    sensing means is provided to sense when the center beam is coplanar with the side beams and cause said vacuum means to be switched from said center beam to said side beams.

* * * * *